United States Patent [19]

Davis et al.

[11] Patent Number: 4,766,295

[45] Date of Patent: Aug. 23, 1988

[54] ELECTRONIC PRICING DISPLAY SYSTEM

[75] Inventors: Malcolm H. Davis; Kent A. Janes; Daniel J. Kleffner; William P. Seltzer; Hugh F. Spence, all of San Antonio, Tex.

[73] Assignee: H.E. Butt Grocery Company, San Antonio, Tex.

[21] Appl. No.: 21,328

[22] Filed: Mar. 2, 1987

[51] Int. Cl.[4] .............................................. G06F 15/24
[52] U.S. Cl. ..................................... 235/383; 364/464
[58] Field of Search ................ 235/383, 385; 364/401, 364/464

[56] References Cited

U.S. PATENT DOCUMENTS

| | | |
|---|---|---|
| 3,633,158 | 1/1972 | Heibel . |
| 4,002,886 | 1/1977 | Sundelin . |
| 4,091,272 | 5/1978 | Richter et al. . |
| 4,139,149 | 2/1979 | Crepeau ........................ 364/400 X |
| 4,231,031 | 10/1980 | Crowther et al. . |
| 4,438,432 | 3/1984 | Hurcum . |
| 4,500,880 | 2/1985 | Gomerall et al. . |
| 4,514,631 | 4/1985 | Guscott . |
| 4,521,677 | 6/1985 | Sarwin ........................... 235/383 X |

Primary Examiner—Jerry Smith
Assistant Examiner—Steven G. Kibby
Attorney, Agent, or Firm—Vinson & Elkins

[57] ABSTRACT

An electronic pricing display system for displaying pricing and other specialized information in real time on shelf display tags (18). Display tags (18) are battery operated and receive remotely transmitted infrared signals from optical heads (20) mounted on the ceiling of a store. A handheld electronic controller (22) may be carried by store personnel for obtaining information from or sending information to a selected wireless display tag (18). Pricing information from a main computer (10) is connected by an electronic interface (23) including a microprocessor (24) into a serial information stream having two separate frequencies for relay to the optical heads (20).

14 Claims, 2 Drawing Sheets

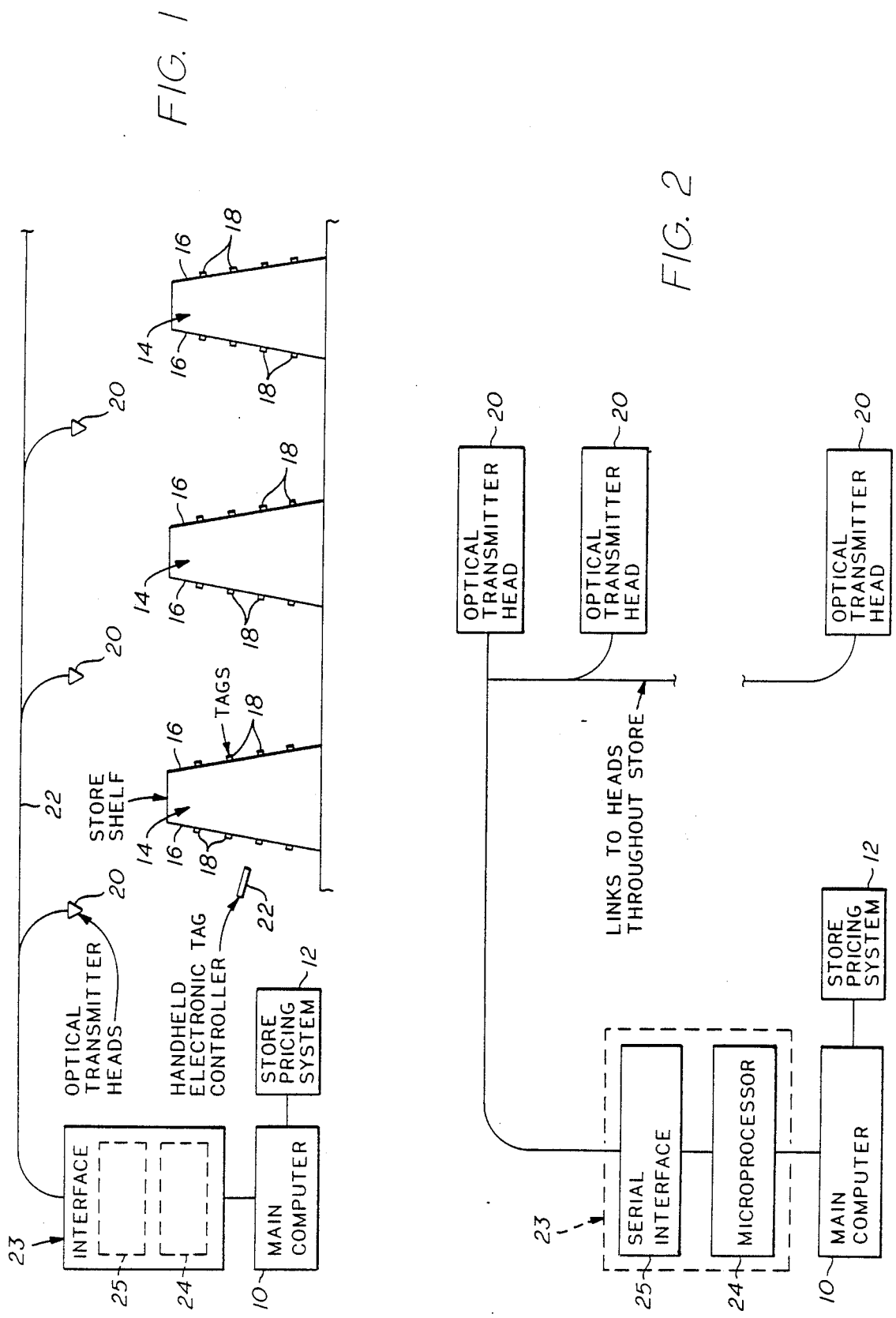

ELECTRONIC PRICING DISPLAY SYSTEM

BACKGROUND OF THE INVENTION

This invention relates to an electronic pricing display system for displaying current pricing information in real time onto shelf display tags or units, and more particularly to such a system in which computer based information in the form of an address code followed by pricing information is transmitted to store shelf tags for display of the pricing information.

Heretofore, such as illustrated in U.S. Pat. No. 4,500,880, dated Feb. 19, 1985, electronic pricing display systems have been utilized for electronically displaying pricing and other specialized information which is associated with a universal product code (UPC) in the fom of a bar code. A plurality of remote price display units are mounted on store shelves adjacent to associated products and each of the plurality of display units is hard wired to a store based computer which carries both power and associated data. Each of the display units shown in U.S. Pat. No. 4,500,880 stores a programmed address code which is verified by information applied by the store based computer before further data is supplied to the display units. An optical scanner reads the UPC bar code and supplies the correct price to a cash register for manual entry by a clerk.

U.S. Pat. No. 4,002,886 to Ronald M. Sundelin dated Jan. 11, 1977 likewise shows an electronic price display unit in which the price displayed is set by the same computer which supplies prices to a point of sale teminal at a cash register, for example, and this insures that whenever the price of an item is changed in the computer memory the price displayed is automatically changed to the same new price. While Sundelin states that the means for connecting the price display unit or tag to the computer may comprise wires or other conductors, electromagnetic transmission and reception, or any combination, the interface shown and described between the store based computer and the price display unit or tag utilizes four conductors or wires between the computer and price display unit including a wire conductor for the power supply, a wire conductor for the transmission of electrically coded information, and a wire conductor for the transmission of clock and reset pulses to the price display unit.

SUMMARY OF THE INVENTION

The present invention is directed particularly to a retail pricing display system for displaying current pricing information onto wireless shelf tags from a store based computer.

Each wireless shelf display tag or unit is mounted adjacent a product or item to be purchased and is battery powered without any wiring to other components of the pricing system for power or for pricing information. Each display tag has an individual address code and receives a remotely transmitted optical signal from an electronic transmitter including an address code. Upon verification of the address code, the display tag accepts the pricing information from the optical transmitter and visually displays such information. Also, the wireless display tag has the capability of transmitting within its immediate vicinity certain information which may be received by a capacitively coupled handheld receiver or controller carried by personnel in such immediate vicinity.

Such a handheld controller which acts both as a transmitter and receiver may receive information from a selected electronic price display tag to verify its address while the handheld controller is close to or in the immediate vicinity of the display tag. The controller may transmit information to the wireless display tag for changing the address of the tag or altering the information displayed by the display tag.

Price changes are being made continuously to reflect cost variations and special sale events and it is highly desirable that current pricing information be provided to the display tag or unit by a store based computer which stores the pricing information. It is costly and time consuming to have the store based computer hard-wired to the shelf display tags or units as thousands of display units may be involved. Such pricing information should be updated automatically as soon as received by the main store based computer and thus, may be displayed in real time and changed automatically at all times during and outside of normal business hours.

For transmitting the information to the wireless shelf display tags, a plurality of optical transmitter heads are positioned in fixed relation at selected locations throughout the store, such as being positioned on the overhead ceiling so that direct or reflected communications are provided between the transmitter heads and the wireless display tags on the store shelves. The interface or communication connection between the store based computer and the optical transmitter heads is by wire or fiber optic links. The interface includes a microcomputer system in communication with the store's pricing system and suitable software for the microcomputer system. The software receives information from the store's pricing system and prepares automatically the communication signal to the optical transmitter heads for transmission to the wireless pricing display tags or units. The optical transmitter heads broadcast to all of the display pricing tags. The display pricing tags include an infrared photodetector which detects modulated infrared energy from the optical transmitter heads or from the handheld controllers. The signal from the infrared photodetector is converted by an associated receiver and amplified into a digital signal for demodulation.

It is an object of the present invention to provide a computer-driven retail pricing display system for displaying pricing information onto wireless store display shelf tags or units.

It is a further object of this invention to provide such a display system in which a store based main computer containing the pricing information provides such pricing information to an electronic unit which formats the information and relays it to a plurality of optical transmitting heads positioned selectively throughout the store for optically transmitting desired information to the wireless pricing display tags.

An additional object of this invention is to provide a wireless pricing display tag utilized in combination with such a pricing system in which the wireless tag is battery powered and includes an infrared photodetector for detecting modulated infrared energy from the optical transmitting heads and for converting the infrared signal into a digital signal for demodulation.

A still further object of this invention is to provide a handheld controller which may be carried by personnel for receiving information from and transmitting information to a selected individual wireless display tag while in the immediate vicinity of the display tag for verifying the address code of the tag, and then changing such address code or altering the pricing information displayed by the selected wireless display tag.

An additional object of the invention is to provide such a wireless pricing display tag for a computer-driven pricing system in which a wireless shelf display tag receives information through infrared energy from either optical transmitting heads at a remote location or from a handheld controller in the immediate vicinity of the associated shelf display tag.

Another object of the invention is to provide an optical transmitter head which receives information via a wire or fiber optic link, and then transmits such information in the form of an infrared communication signal.

BRIEF DESCRIPTION OF THE DRAWINGS

The invention together with its further objects and advantages may be best understood by reference to the following description when taken in conjunction with the accompanying drawings, in which:

FIG. 1 is a block diagram of the retail pricing display system of this invention illustrating a plurality of optical transmitter heads positioned at selective overhead locations in a store for transmitting by infrared energy information to wireless shelf display tags on store shelves;

FIG. 2 is a block diagram of the interface structure between the store's main computer and the optical transmitter heads including a microcomputer and associated software to receive and develop the pricing information for routing to the optical transmitter heads and transmission to the wireless tags;

DESCRIPTION OF THE INVENTION

Figure 3:
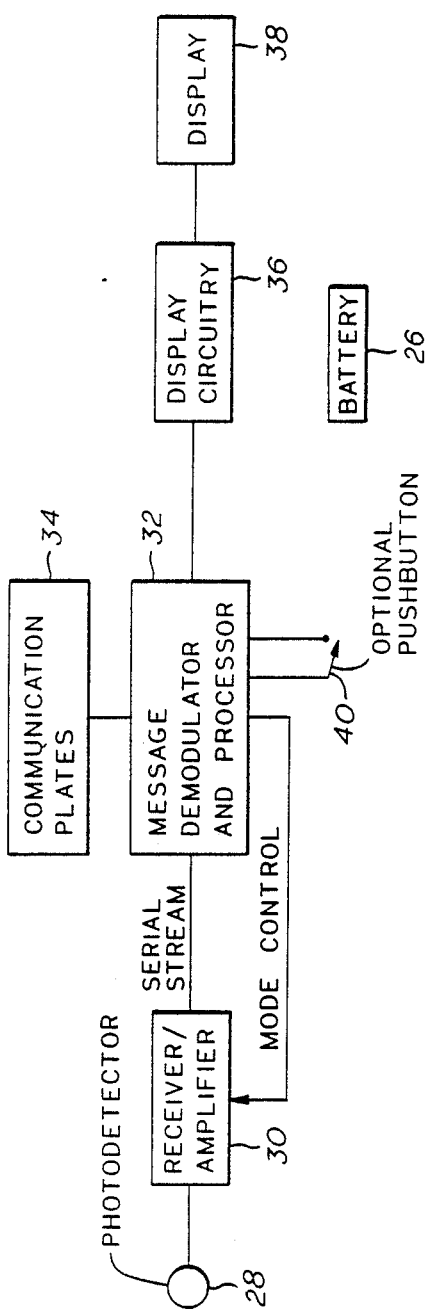
FIG. 3 is a block diagram of the wireless shelf display tag or unit showing the electronic integrated circuit and various components thereof.

The electronic pricing display system comprising this invention provides for the automatic updating of pricing information associated with store shelf items or products to be purchased by customers, and ensures that the price or other information displayed adjacent the shelf item is accurate and current.

Referring now particularly to FIG. 1 for a better understanding of the invention, the electronic pricing display system includes a main computer generally indicated at 10 and positioned at some central location in the store. The main computer 10 such as an IBM personal computer, an NCR Tower series computer, or a DEC minicomputer manufactured by Digital Equipment Corporation, for example, stores all of the pricing information in the store's pricing system indicated generally at 12. Pricing system 12 may include remote computers and scanners, such as for example, the IBM scanning system, the Datachecker scanning system, or the NCR scanning system. The store nomally includes shelf stands generally indicated at 14 arranged on the floor of the store with suitable aisles between the shelves for shoppers or purchasers. Shelf stands 14 have opposed sides 16 thereon and each side includes a plurality of parallel shelves for supporting and displaying products or items to be purchased. Positioned at intervals along each shelf adjacent selected products or items to be purchased are a plurality of wireless electronic shelf display tags or units indicated generally at 18.

A plurality of optical transmitter heads illustrated generally at 20 are positioned at selected fixed positions in the store such as extending from a ceiling 22, for example. Heads 20 utilize infrared emitting diodes for sending infrared signals to each of the individual wireless display tags 18. Display tags 18 are battery operated and receive the remotely transmitted infrared signal from optical heads 20. As infrared signals may be reflected, it is not necessary to have a direct line of sight contact between transmitter heads 20 and each display tag 18 as an area adjacent the display tag 18 may be flooded with infrared signals from several transmitter heads 20. The infrared signals from heads 20 from such reflection or bouncing may be of an intensity to cover an area within a radius of ten (10) to twenty (20) feet, for example, and yet be received adequately by tags 18.

A handheld electronic controller is indicated schematically at 22 and may be carried by personnel within the store for obtaining information from or sending information to a selected wireless pricing display tag 18 from a position close to or in the immediate vicinity of the selected wireless tag 18. The handheld controller 22 includes an electronic receiver to verify the address of a selected wireless display unit 18, and an optical transmitter for changing the pricing information on the selected wireless tag 18 as may be desirable under certain conditions from a position closely adjacent the selected wireless pricing tag 18.

The store's normal pricing system as illustrated generally at 12 may include other remote computers and scanners, for example, not illustrated, which provide information to main computer 10. As shown in FIG. 2, the present invention includes an electronic communication interface generally indicated at 23 positioned between the main computer 10 and optical heads 20 for formatting the information from main computer 10 and relaying the information in a serial format to transmitter heads 20. The electronic interface 23 includes a microprocessor 24 and a serial interface 25. Serial interface 25 accepts information from microprocessor 23 and modulates the serial information stream into two separate frequencies, such as around eight (8) kilohertz and twelve (12) kilohertz for example, which is then routed to optical transmitter heads 20 for optical transmission by infrared energy to wireless display tags 18. The serial information stream of a valid message contains (1) an address field, (2) an error checking field, (3) a function field, and (4) a data field. The serial data stream from communications interface 23 is linked to transmitter heads 20 by wire or suitable fiber optic links.

Transmitter heads 20 contain electronic circuitry to receive the serial data stream from communications interface 24 and provide the necessary drive current for an infrared light emitting diode or diodes on the surface of heads 20. Since electronic circuitry is provided at the transmitter heads 20, possible radio interference problems from the diode currents on the wire links from communications interface 24 to optical transmitter heads 20 are avoided. The number and location of transmitter heads 20 will be detemined by the number and location of wireless display tags 18 in order to provide optical coverage of wireless tags 18 for receiving an optical communication signal. All of the transmitter heads 20 will operate simultaneously so that the optical signal is broadcast or transmitted simultaneously to all wireless display tags 18.

Referring now to FIG. 3, a block diagram of the electronic circuitry and components of wireless tag or unit 18 is illustrated. A battery 26 is shown for supplying power to display tags 18. An infrared photodetector is shown at 28 for detecting modulated infrared energy emitted by optical transmitters 20 or by handheld controllers 22. The optical signal from the infrared photodetector 28 passes through a receiver and amplifier section 30 which converts the infrared signal into a digital signal for demodulation. Receiver/amplifier section 30 is capable of operating in two modes, one mode being a high gain mode and the other being a low gain mode. The high gain mode is intended for use whenever the infrared energy received by photodetector 28 is low as may be expected when the infrared signal is emitted from optical transmitters 20. In the high gain mode, all stages of the receiver and amplifier section 30 are powered. The low gain mode is intended for use when the infrared signal is strong as is expected when the signal is emitted by handheld controller 22 in the immediate vicinity of or close to a selected wireless tag 18. In this event several stages of receiver and amplifier section 30 are unpowered. To reduce the power drawn from battery 26 and thereby prolong battery life, the high gain mode is enabled or energized periodically. If during an enabled period the display tags 18 sense emitted signals as emitted by transmitter heads 20, receiver and amplifier section 30 will be held in the high gain mode for a predetermined period of time after transmitter heads 20 cease to emit an infrared signal. Receiver and amplifier section 30 and the digital circuitry of wireless tag 18 are designed to be implemented in low power integrated circuitry.

The digital signal provided by receiver and amplifier section 30 provides the message demodulator and processor shown at 32 with information bits in a serial data stream, a clocking signal, and a valid data signal. Message demodulator and processor 32 in turn provides mode control signals for the receiver and amplifier circuit. The serial data, the clocking signal, and the valid data signal are routed to processing circuitry. The serial data stream of a valid message has a structure which is acted upon by the processing structure. A valid message contains (1) an address field, (2) an error checking field, (3) a function field, and (4) a data field. The processing circuitry perfoms operations on each of these fields.

The address field of the message is compared with the tag address stored within the circuitry. Infomation stored within wireless tag 18 may be altered only if the address field in a message and the address data stored within wireless tag 18 match and there are no message errors. Message errors are determined by error processing circuitry which acts upon all of the data in a message.

The function field of the message causes processing circuitry of wireless tag 18 to perfom one of several functions. One function is to cause the data field of the message to replace the information being displayed by wireless tag 18. This function is performed only if the address stored in the display tag 18 matches the address in the received message and there are no errors in the message. A second function is to cause the internally stored address in wireless tag 18 to be transmitted serially by means of modulated signals applied to small electrically conductive communication plates indicated diagrammatically at 34. The metal plates 34 provide a short range communication to handheld electronic controller 22 from a location close to tag 18. The second function does not require that addresses match between controller 22 and wireless tag 18, only that a valid message be received from controller 22. A third function is to cause the data field of the message to replace the internally stored address of wireless tag 18. This pemits the address of wireless tag 18 to be changed or set initially by the controller 22.

The processor or processing unit shown at 32 also provides timing and control for all of the circuitry of tag 18. The display circuitry of wireless tag 18 indicated at 36 develops a drive signal for the display shown at 38 from the data stored in a display buffer. The contents of the display buffer are alterable from received messages as described above. Display circuitry 36 is designed to drive liquid crystal displays which have a low power requirement. However, it is understood that other types of displays may be utilized with slight changes in drive circuitry as well known in the art. The display circuitry shown at 36 may present all of the information stored in the display buffer on display 38 in two groupings on display 38 such as the item price and unit price. Alternately, partial presentation of the display buffer information on a reduced display may be accomplished. The initially undisplayed information would replace the original display information whenever a button or switch indicated at 40 is activated.

Figure 4:
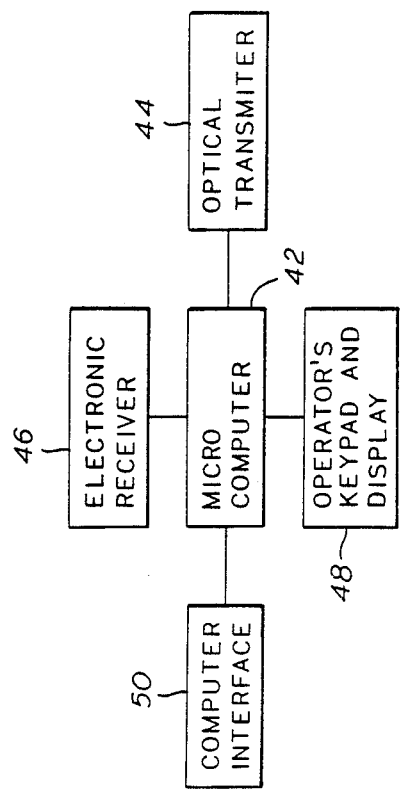
FIG. 4 is a block diagram of the handheld electronic controller for selected wireless shelf display tags.

Referring now to FIG. 4, a diagrammatic block diagram is illustrated for the circuitry including components of controller 22. Controller 22 which may be hand carried by selected store personnel is a handheld battery powered unit which allows the operator to communicate with and control a wireless tag 18. Controller 22 is adapted for operating with a single selected wireless tag 18 while in its immediate vicinity and may control the same functions of wireless tag 18 as does transmitter heads 20. Also, controller 22 can request the address for a selected tag 18.

Controller 22 includes a microcomputer 42 having a short range optical transmitter 44 and an electronic receiver 46. Electronic receiver 46 receives a low level signal radiated by communication plates 34 of tag 18 which is utilized for communicating the address of wireless tag 18. Controller 22 also includes a key pad and display shown at 48. In addition, an interface is illustrated at 50 for linking microcomputer 42 and controller 22 with main computer 10 or other computers as desired. The connection to a computer may be utilized for reporting selected shelf items for inventory or for ordering purposes. While controller 22 is shown as being battery powered, it could be connected, if desired, to a power supply.

Each tag 18 for associated shelf items or articles would normally have a code therein in the form of binary numbers, for example, which would be utilized for the fomatted address code.

From the above, it is to be understood an electronic pricing system has been provided in which wireless shelf tags 18 have been utilized for receiving a serial data stream through infrared energy from optical transmitter heads 20 that are selectively located at various locations throughout the store, or alternately, receiving information from a handheld electronic controller. The pricing system of this invention may utilize pricing and other specialized information which is associated with a universal product code (UPC), a European article number (EAN), or other types of bar codes.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A computer driven system for displaying product pricing information, said system comprising:
    a source of computer based information, said information including a programmed address code and product pricing information;
    a plurality of transmitters located in a store and adapted to receive said computer based information, said transmitters comprising means for converting said computer based information into a modulated signal and means for wireless transmission of said modulated signal throughout an area of said store;
    a plurality of remote wireless display tags positioned adjacent selected product locations in said area of said store, each said display tag comprising,
    means for receiving said modulated signal including said programmed address code and said product pricing information,
    processor means for storing internally a local address code for said display tag and for comparing said received programmed address code with said local address code, and
    display means responsive to said processor means for selectively displaying said received product pricing information when said local address code matches said programmed address code; and
    a hand-held controller for providing information directly to a selected display tag from the immediate vicinity of said selected tag, said controller comprising a microcomputer and a short range transmitter, whereby said hand-held controller when placed in the immediate vicinity of a selected display tag can transmit specific pricing information directly to said selected display tag for display thereon, independently of said source of computer based information.

2. The system according to claim 1 wherein said means for wireless transmission of said modulated signal comprise means for emitting infrared energy and wherein said means for receiving said modulated signal comprise means for detecting infrared energy.

3. The system according to claim 1 wherein said source of computer based information comprises a main computer having said product pricing information stored therein and interface means connected between said main computer and said transmitters for providing a serial data stream of said computer based information to said transmitters, said information comprising a programmed address field, an error checking field, a function field, and a data field.

4. The system according to claim 3 wherein a command in said function field causes said processor means to change and initially to set said local address codes of said display tags.

5. The system according to claim 1 wherein said wireless remote display tags are powered by electrical storage batteries.

6. The system according to claim 1 wherein said wireless remote display tags comprise additionally circuit means to prevent changing of information displayed by said display tags responsive to said transmitted modulated signal unless said programmed address code of said transmitted modulated signal matches said local address code stored internally in said display tag.

7. The system according to claim 1 comprising additionally receiver/amplifier means in said display tags adapted to convert said received modulated signal into a digital signal, to amplify said digital signal and to transmit said amplified digital signal to said processor means, said receiver/amplifier means containing circuitry for operation in a high gain mode and in a low gain mode, said high gain mode being adapted for operation when said modulated signal is received from one of said plurality of transmitters and said low gain mode being adapted for operation when a signal is received from said hand-held controller.

8. A computer driven system for displaying product pricing information, said system comprising:
    a main computer having product pricing information stored therein;
    interface means operatively connected to said main computer and having means to receive product pricing information transmitted from said main computer and for preparing a desired signal for transmission by a plurality of optical transmitters, said signal comprising a programmed address code and product pricing information;
    a plurality of optical transmitters located in a store and connected to said interface means, said optical transmitters comprising means for receiving said signal from said interface means and means for wireless transmission of said signal throughout an area of a store in the fom of infra-red energy;
    a plurality of remote wireless display tags positioned adjacent selected product locations in said area of said store, each of said display tags comprising,
    a source of operating power,
    means for receiving said transmitted infra-red signal from said transmitters, said signal containing said programmed address code and said pricing information,
    processor means comprising means for storing internally a local address code for said display tag and for comparing said received programmed address code with said local address code, and
    display means responsive to said processor means for displaying said received product pricing information when said local address code matches said programmed address code; and
    a hand-held controller for providing information directly to a selected display tag from the immediate vicinity of said selected tag, said controller comprising a microcomputer, a short range transmitter and means for determining the internally stored local address code of said selected tag, whereby said hand-held controller when placed in the immediate vicinity of a selected display tag can detemine the local address of the selected display tag and can transmit pricing information directly to the selected display tag for display thereon.

9. The system according to claim 8 wherein each of said remote wireless display tags comprises additionally local transmitter means for transmitting a short range signal containing said local address code stored in said display tag and wherein said means in said hand-held controller for determining the local address of said selected display tag comprise means for receiving said signal transmitted from said display tag.

10. The system according to claim 8 wherein said power source for said display tag comprises electric storage batteries.

11. The system according to claim 8 comprising additionally receiver/amplifier means in said display tags adapted to convert said received infra-red signal into a digital signal, to amplify said digital signal and to transmit said amplified digital signal to said processor means, said receiver/amplifier means containing circuitry for operation in a high gain mode and in a low gain mode, said high gain mode being adapted for operation when said infrared signal is received from said transmitters and said low gain mode being adapted for operation when a signal is received from said hand-held controller.

12. The system according to claim 11 comprising additionally power conservation means in said display tags, said power conservation means comprsing means for normally operating said receiver/amplifier means in said low gain mode, means for periodically actuating said high gain mode, means for detecting whether an infra-red signal is being received from said tranmitters while-said high gain mode is actuated and, if so, for retaining said receiver/amplifier in said high gain mode for a pre-determined period of time after an infra-red signal from said transmitter no longer is detected.

13. The system according to claim 8 wherein said wireless remote display tags comprise additionally circuit means to prevent changing of information displayed by said display tags responsive to said transmitted infra-red signal unless said programmed address code of said transmitted infra-red signal matches said local address code stored internally in said display tag.

14. The system according to claim 8 wherein said remote wireless display tags comprise additionally storage means for internal storage and sequential display of a plurality of product pricing information messages and external manually operable means for actuating said internal storage means whereby each said display tag may be actuated manually to display a plurality of sequential product pricing information messages.

* * * * *